(12) United States Patent
Hembree

(10) Patent No.: US 7,467,582 B2
(45) Date of Patent: *Dec. 23, 2008

(54) PUMP DIAPHRAGM RUPTURE DETECTION

(75) Inventor: Richard Hembree, Bellingham, WA (US)

(73) Assignee: Wanner Engineering, Inc., Minneapolis, MN (US)

( * ) Notice: Subject to any disclaimer, the term of this patent is extended or adjusted under 35 U.S.C. 154(b) by 525 days.

This patent is subject to a terminal disclaimer.

(21) Appl. No.: 11/148,834

(22) Filed: Jun. 9, 2005

(65) Prior Publication Data

US 2005/0226743 A1    Oct. 13, 2005

Related U.S. Application Data

(63) Continuation of application No. 10/726,984, filed on Dec. 2, 2003, now Pat. No. 6,941,853.

(51) Int. Cl.
*F16J 3/02* (2006.01)

(52) U.S. Cl. .................. 92/98 R; 92/5 R; 92/103 R; 92/153

(58) Field of Classification Search .............. 92/5 R, 92/98 R, 99, 103 R, 103 SD, 153, 155
See application file for complete search history.

(56) References Cited

U.S. PATENT DOCUMENTS

| | | | |
|---|---|---|---|
| 2,323,950 A | 7/1943 | Wade | |
| 3,431,823 A | 3/1969 | Orlita | |
| 4,569,634 A | 2/1986 | Mantell | |
| 4,740,139 A | 4/1988 | Mantell | |
| 4,781,535 A | 11/1988 | Frawley et al. | |
| 4,787,825 A | 11/1988 | Mantell | |
| 4,934,902 A | 6/1990 | Mantell | |
| 4,971,523 A | 11/1990 | Wacker et al. | |
| 5,074,757 A | 12/1991 | Horn | |
| 5,560,279 A | 10/1996 | Connors et al. | |
| 6,498,496 B1 | 12/2002 | Keller et al. | |
| 6,523,454 B2 | 2/2003 | Rohner | |
| 6,941,853 B2 * | 9/2005 | Hembree | 92/98 R |

* cited by examiner

*Primary Examiner*—Michael Leslie
(74) *Attorney, Agent, or Firm*—Merchant & Gould P.C.

(57) ABSTRACT

A hydraulically driven pump includes a first chamber exposed to a process fluid, a second chamber configured to retain a hydraulic fluid, and a multi-layer diaphragm positioned between the first and second chambers. The diaphragm includes a first layer in contact with the process fluid being pumped, a second layer in contact with the hydraulic fluid, and a third layer that includes an elastomeric base material and an elastomeric conductive trace embedded in the elastomeric base material. The third layer is positioned between the first and second layers and being movable relative to the first and second layers. Changes in an electrical resistance of the conductive trace indicate a failure condition in one of the first, second and third layers.

38 Claims, 11 Drawing Sheets

SUCTION STROKE
INSIDE PSI = FLUID PLUS 3 PSI

OUTPUT STROKE

PUMP DIAPHRAGM RUPTURE DETECTION

This application is a continuation of U.S. application Ser. No. 10/726,984, filed Dec. 2, 2003.

BACKGROUND OF THE INVENTION

1. Technical Field

The invention generally relates to hydraulically driven pumps, and more specifically relates to diaphragms for hydraulically driven pumps.

2. Related Art

The known rotary-operated, oil-backed/driven diaphragm pump is a high-pressure pump inherently capable of pumping many difficult fluids because in the process fluid, it has no sliding pistons or seals to abrade. The diaphragm isolates the pump completely from the surrounding environment (the process fluid), thereby protecting the pump from contamination.

In general, a diaphragm pump 20 is shown in FIGS. 9 and 10. Pump 20 has a drive shaft 22 rigidly held in the pump housing 24 by a large tapered roller bearing 26 at the rear of the shaft and a small bearing (not shown) at the front of the shaft. Sandwiched between another pair of large bearings (not shown) is a fixed-angle cam or wobble plate 28. As the drive shaft turns, the wobble plate moves, oscillating forward and back converting axial motion into linear motion. The three piston assemblies 30 (only one piston assembly is shown) are alternately displaced by the wobble plate 28. As shown later, each piston is in an enclosure including a cylinder such that the enclosure is filled with oil. A ball check valve 32 in the bottom of the piston/cylinder assembly 30 functions to allow oil from a reservoir 27 (wobble plate 28 is in the reservoir) to fill the enclosure on the suction stroke. During the output or pumping stroke, the held oil in the enclosure pressurizes the back side of diaphragm 34 and as the wobble plate moves, causes the diaphragm to flex forward to provide the pumping action. Ideally, the pump hydraulically balances the pressure across the diaphragm over the complete design pressure range. As discussed later, in actual practice this is not the case for all situations for known pumps. In any case, each diaphragm has its own pumping chamber that contains an inlet and an outlet check valve assembly 36, 37. As the diaphragm retracts, process fluid enters the pump through a common inlet and passes through one of the inlet check valves. On the output or pumping stroke, the diaphragm forces the process fluid out the discharge check valve and through the manifold common outlet. The diaphragms, equally spaced 120° from one another, operate sequentially to provide constant, virtually pulse-free flow of process fluid.

The diaphragm 34 is held between two portions 38, 40 of housing 24. Diaphragm 34 separates the pump side from the oil-filled, hydraulic drive side of the pump. On the drive side, a drive piston assembly 30 including a diaphragm plunger 42 is contained within the oil filled enclosure which functions as a transfer chamber 44. A pair of check valves 32 in piston 46 separate transfer chamber 44 from the oil reservoir (not shown). Wobble plate 28 (not shown in FIG. 2) contacts pad 48 to drive piston 46. Arrow 49 indicates the general direction of movement of the cam or wobble plate. When the piston and diaphragm have finished the forward or pumping stroke, the end 50 of piston 46 is at top dead center (TDC). When the piston and diaphragm have retracted in the suction stroke, the end 50 of piston 46 is at bottom dead center (BDC).

FIGS. 11(a)-(f) illustrate operation of the conventional pump 20 under normal, standard operating conditions using a conventional bias spring 96. Typical pressures are shown. Typical vector directions for the cam or wobble plate (not shown in FIGS. 11(a)-(f) are shown. Suction is less than 14.7 psia. Output pressure is greater than 14.7 psia. The pressure differential across diaphragm 34 is set at about 3 psia.

With reference to FIG. 11(a), the suction stroke begins at the end of the pumping stroke. For the conditions assumed, pressure in the pumping chamber immediately drops from what it was at high pressure, for example, 120 psia to 10 psia. Pressure in the hydraulic transfer chamber is 13 psia, which is less than the 14.7 psia in the reservoir. The piston 30 is at top dead center and begins moving toward bottom dead center. Bias spring 96 momentarily moves plunger 42, and particularly valve spool 84, to the right to open port 98. Because pressure in the transfer chamber is less than the pressure in the reservoir, check valve 46 opens and oil flows from the reservoir to the transfer chamber to appropriately fill it with oil that had been lost during the pumping stroke previous. That is, under the pressure of the pumping stroke oil flows through somewhat loose tolerances of the parts of the piston so that the some oil flows from the transfer chamber back to the reservoir. Thus oil needs to be refilled in the transfer chamber during the suction stroke so that there is enough oil to efficiently provide pressure during the next pumping stroke.

FIG. 11(b) shows the configuration at mid-stroke. The slight suction in the pumping chamber (shown to be 10 psia), holds diaphragm 34 and spool 84 to the left while piston 30 moves to the right, thereby shutting off port 98. Since pressures are nearly equal and diaphragm 34 moves right with piston 30, the pumping chamber fills with process fluid.

As shown in FIG. 11(c), process fluid continues to fill as diaphragm 34 moves right. Valve port 98 remains shut. Very little leakage of oil occurs from the reservoir (not shown) to transfer chamber 44, since pressures are nearly equal. Thus, both sides of the diaphragm fill properly.

When piston 30 reaches bottom dead center, the suction stroke is completed and the output or pumping stroke begins. Pressure in the transfer chamber immediately increases, for example, from 13 psia to 123 psia. Likewise, pressure in the pumping chamber immediately increases, for example, from 10 psia to 120 psia. The wobble plate begins moving piston 30 to the left, which causes the build-up of pressure. Check valves 32 close. Diaphragm 34 moves in volume tandem with the oil and process fluid left with the piston to push (pump) process fluid out.

At mid-stroke as shown in FIG. 11(e), there is continued output. Some oil leakage past the tolerances between piston and cylinder may move valve spool 84 of diaphragm plunger 42 to the right to open valve port 98. Check valves 32, however, are closed, thereby locking the oil in transfer chamber 44, except for leakage.

The output stroke finishes with the configuration shown in FIG. 11(f). The filled transfer chamber 44 pushes diaphragm 32 to the left dispensing process fluid as it moves. Normal operation as shown in FIGS. 11(a)-(f) causes little stress on diaphragm 32.

Piston 46 reciprocates in cylinder 47. Piston 46 has a sleeve section 52 that forms the outer wall of the piston. Sleeve section 52 includes a sleeve 54 and an end portion 56 at the end having pad 48 that is contact with the wobble plate. Within sleeve 54 is contained a base section 58. Base section 58 includes a first base 60 that is in contact with end portion 56 and includes seal elements 62 for sealing between first base 60 and sleeve 54. Base section 58 also includes second base 64 at the end opposite of first base 60. Connecting wall 66 connects first and second bases 60 and 64. Piston return spring 68 is a coil spring that extends between first base 60 and diaphragm stop 70, which is a part of the pump housing 24. Valve housing 72 is contained within base section 58 and extends between second base 64 and end portion 56. Seals 74 provide a seal mechanism between valve housing 72 and connecting wall 66 near second base 64.

The end 76 opposite end portion 56 of sleeve portion 52 is open. Likewise, the end 78 of valve housing 72 is open. Second base 64 has an opening 80 for receiving the stem 82 of plunger 42.

Diaphragm plunger 42 has the valve spool 84 fitted within valve housing 72 with the stem 82 extending from the valve spool 84 through opening 80 to head 86 on the transfer chamber side of diaphragm 34. Base plate 88 is on the pumping chamber side of diaphragm 34 and clamps the diaphragm to head 86 using a screw 90 which threads into the hollow portion 92 of plunger 42. Hollow portion 92 extends axially from one end of plunger 42 to the other end. Screw 90 is threaded into the diaphragm end. The piston end of hollow portion 92 is open. A plurality of radially directed openings 94 are provided in stem 82. A bias spring 96 is a coil spring and extends between second base 64 and valve spool 84. A valve port 98 is provided in the wall of valve housing 72. A groove 100 extends in connecting wall 66 from the furthest travel of valve port 100 to end portion 56. A check valve 102 is formed in end portion 56 in a passage 104, which is fluid communication with the reservoir (not shown). Thus, there is fluid communication from the reservoir (not shown) through passage 104 and check valve 102 via groove 100 to valve port 98. When the valve is open, there is further communication through the space in which coil spring 96 is located and then through one of the plurality of radial openings 94 and through the axial hollow portion 92 of plunger 84. There is further fluid communication from the hollow portion 92 through the other radially directed openings 94 to various portions of transfer chamber 44. The hollow passage 92, along with the radially directed openings 94 provide fluid communication from the portion of transfer chamber 44 near diaphragm 34 to the portion of transfer chamber 44 within the valve housing 72 of piston 30. The transfer chamber also includes the space occupied by piston return spring 68.

On the pump side of diaphragm 34, there is an inlet check valve assembly 36 which opens during the suction stroke when a vacuum is created in pumping chamber 106. There is also a check valve 37 that opens during the pumping or output stroke when pressure is created in pumping chamber 106.

A problem with conventional diaphragm pumps, however, is an unexpected diaphragm rupture under certain operating conditions. The diaphragm can fail much sooner than normal, or more frequently, may fail sooner than other pump components. A failure contaminates the process lines with drive oil. The operating condition that most often causes failure is a high vacuum inlet with a corresponding low outlet pressure. This is an expected occurrence in a typical pumping system when the inlet filter begins to plug. In that case, the plugging requires high vacuum to now pull process fluid through the filter. At the same time, the lowering of process fluid volume pumped drops the outlet pressure. This creates a situation where a high suction on the pumping side lowers the pressure during the suction stroke on the transfer chamber side so that the transfer chamber essentially "asks for more fill fluid" and, consequently, in-flowing oil overfills the transfer chamber and does so without a corresponding high pressure to push oil out during the pumping or output stroke to counter-balance. The overfill of oil "balloons" the diaphragm into the fluid valve port until the diaphragm tears. Additionally, with a high-speed, reversing, vacuum/pressure pump such as this apparatus, the high-speed valve closings create tremendous pressure spikes, called Joukobski shocks. The spikes can consist of fluid pressure or acoustical waves and harmonics of both. These pressure spikes can "call for" oil fluid flow into the drive piston when that should not be happening. Again, this can cause overfill and lead to the diaphragm failure.

Because of the possibility of diaphragm rupture, hydraulically driven pumps are typically unsuitable for many applications that cannot tolerate this type of contamination, such as, for example, spray paint lines. Except for the possibility of contamination due to a ruptured diaphragm, hydraulically driven pumps would be a preferred choice of pumps for many applications. Therefore, there is a need to be able to detect when a diaphragm fails and use that information to shut down the pump.

Various methods for detecting diaphragm rupture have been employed in the past. One example diaphragm rupture detection system includes the use of two diaphragms that have a vacuum between them, as disclosed in U.S. Pat. No. 5,667,368. This method requires the use of complicated hardware for maintaining a vacuum and detecting the loss of vacuum.

Another diaphragm rupture detection method uses two diaphragms that are separated by a liquid. This method, as disclosed in U.S. Pat. No. 4,971,523, includes detecting a change in the electrical conductivity of the liquid. This method further requires that the properties of the liquid are different from the pumped fluid so that a change can be detected in the event of a rupture. Thus, a requirement of this method is that intermediate fluid is different than the pumped fluid and the pump oil, which intermediate fluid may have to be changed depending on the conductivity of the pumped fluid.

Another method of diaphragm rupture detection is disclosed in U.S. Pat. No. 4,781,535. This method uses a continuous metal trace formed on the surface of a diaphragm. The trace is monitored for continuity as well as ground fault to the pumped liquid. The ground fault detection is to guard against breakage being masked by the conductivity of the fluid, which would otherwise bridge the conductive trace. Since the trace is required to be metallic, the trace will break if it is exposed to any significant strain. This system enables the use of a metal trace by minimizing the strain through the use of complex trace shapes. U.S. Pat. No. 4,781,535 illustrates several example low deflection, large diameter diaphragms that have relatively low strain.

SUMMARY OF THE INVENTION

The present invention generally relates to hydraulically driven pumps that include a diaphragm. The diaphragm of the present invention includes multiple elastomeric layers with an elastomeric conductive trace embedded in one of the layers. Although the layers may be bonded to each other, in a preferred embodiment the layers are independently movable relative to each other so that wear and fail of each layer occurs independently.

One aspect of the invention relates to a multi-layer diaphragm for use in a hydraulically driven pump. The diaphragm includes a first layer in contact with a pumped process fluid, a second layer in contact with a hydraulic fluid of the pump, and a third layer made of an elastomeric material that includes an elastomeric conductive trace embedded in the elastomeric material. The third layer is positioned between the first and second layers and is independently movable relative to the first and second layers.

Another aspect of the invention relates to a method of manufacturing a pump diaphragm that includes an elastomeric layer and a conductive trace. The method includes forming a first portion of the elastomeric layer, forming the conductive trace on a primary surface of the first portion of the elastomeric layer, and forming a second portion of the elastomeric layer on the primary surface of the first portion over a portion of the conductive trace such that the first and second portions are integral with each other and an outer periphery of the conductive trace is exposed. The conductive trace includes an elastomeric material such as a mixture of silicone and carbon that is resistant to strain condition of at least 20% and is electrically conductive.

A further aspect of the invention relates to a method of detecting rupture of a diaphragm in a hydraulic pump that includes a first, second and third elastomeric layers. The third layer includes an elastomeric material such as silicone and an elastomeric conductive trace embedded in the elastomeric material The method includes positioning the first layer in contact with a fluid being pumped by the hydraulic pump, positioning the second layer in contact with a hydraulic fluid of the hydraulic pump, positioning the third layer between the first and second layers, applying an electric current to the conductive trace, detecting variations in electrical resistance resulting from use of the diaphragm in the hydraulic pump, and generating a detection signal, and shutting off the hydraulic pump when the detection signal is within a predetermined range.

A yet further aspect of the invention relates to a multi-layer diaphragm for use in a hydraulically driven pump that includes a first layer having a first modulus of elasticity, a second layer having a second modulus of elasticity, and a third layer positioned between the first and second layers and having a third modulus of elasticity lower than the first and second modulus of elasticity. The diaphragm also includes an elastomeric conductive trace integral with the third layer and exposed at an outer periphery of the third layer at a location removed from contact with fluids in the pump.

Another aspect of the invention relates to a hydraulically driven pump that includes a first chamber exposed to a process fluid, a second chamber configured to retain a hydraulic fluid, and a multi-layer diaphragm positioned between the first and second chambers. The diaphragm includes a first layer in contact with the process fluid, a second layer in contact with the hydraulic fluid, and a third layer that includes an elastomeric material such as silicone and an elastomeric conductive trace embedded in the elastomeric material. The third layer is preferably positioned between the first and second layers and is preferably independently movable relative to the first and second layers.

DETAILED DESCRIPTION OF THE PREFERRED EMBODIMENT

The present invention generally relates to a diaphragm for a hydraulically driven pump that is an improvement to the conventional diaphragms described above. Like parts are designated by like numerals. Improved parts are distinguished and described. The invention generally relates to hydraulically driven pumps, and more specifically relates to diaphragms for hydraulically driven pumps and the detection of failure in such diaphragms. The diaphragm includes at least three elastomeric layers made of high strain resistant materials. The layer positioned between the other two layers includes a conductive trace embedded therein. Changes in the conductive trace resistance is monitored while the diaphragm is in use. When the resistance values reach a certain predetermined level that indicates failure in one or more of the diaphragm layers, or the possibility of a failure occurring, a failure signal is generated. A rupture of the middle layer will also be detected since a break in the conductive trace would cause an open circuit, which would exceed the predetermined resistance level. The failure signal may be used to shut off the pump, thereby preventing mixing of the hydraulic fluid on one side of the diaphragm with the process fluid being pumped on the other side of the diaphragm within the pump.

Preferably, the layers of the diaphragm are not bonded together such that they are independently movable when the diaphragm is deformed during flexing. When the layers are separate from each other, there is a reduced likelihood that a rupture in one layer will propagate to the adjoining layer. As a result, a failure in one layer of the diaphragm can be detected and the pump shut down before all of the layers fail.

As used in here the term "modulus of elasticity" is defined as the ratio of the increment of some specified form of stress to the increment of some specified form of strain, such as Young's Modulus, the bulk modulus, or the shear modulus. The term "elastomer" or "elastomeric" is defined as a polymeric material, such as a synthetic rubber or plastic, which at room temperature can be stretched under low stress to at least twice its original length and, upon immediate release of the stress, will return with force to its appropriate original length.

Figure 1:
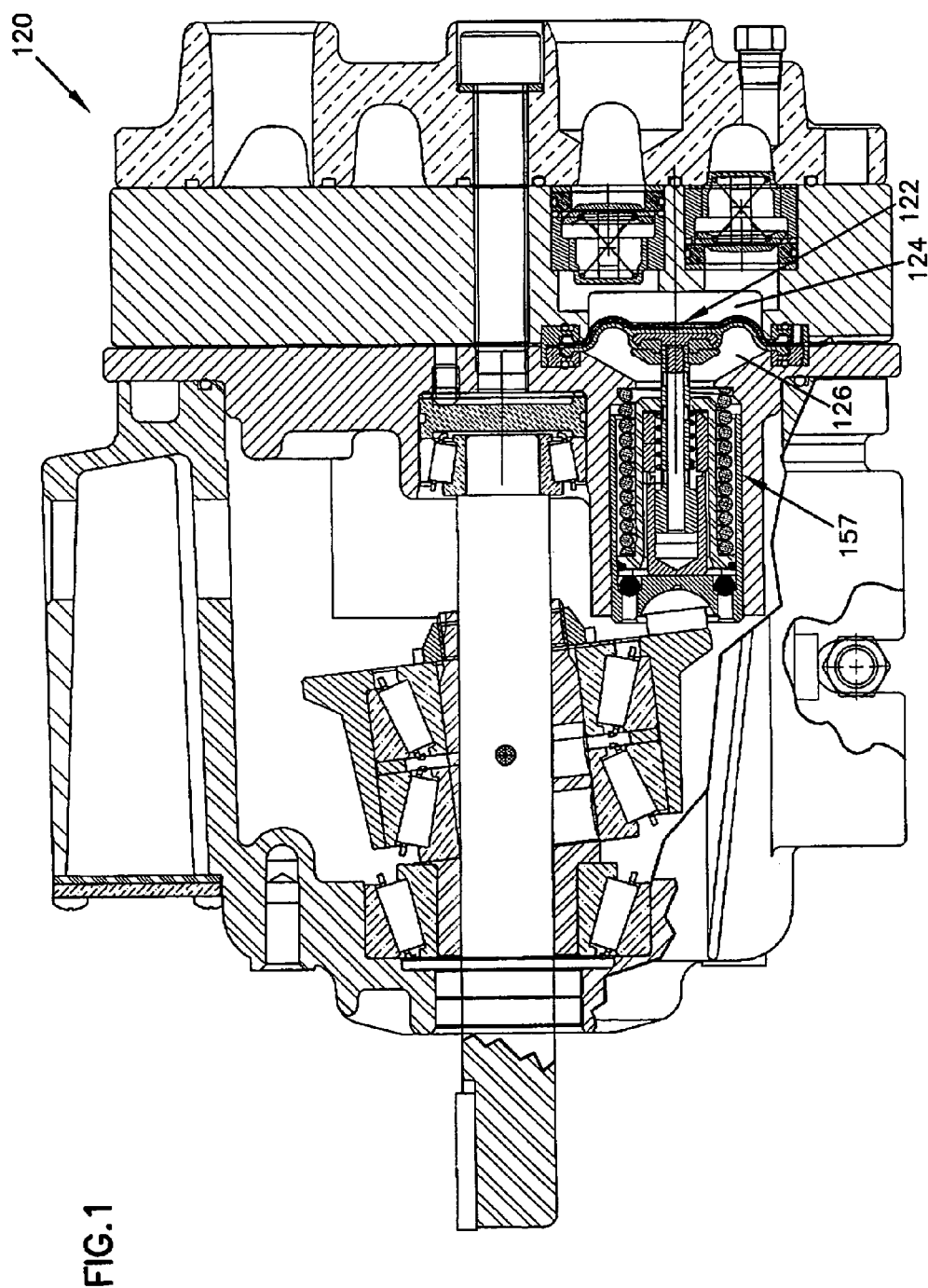
FIG. 1 is a front perspective view of one example pump that includes a diaphragm assembly according to principles of the present invention.
Figure 3:
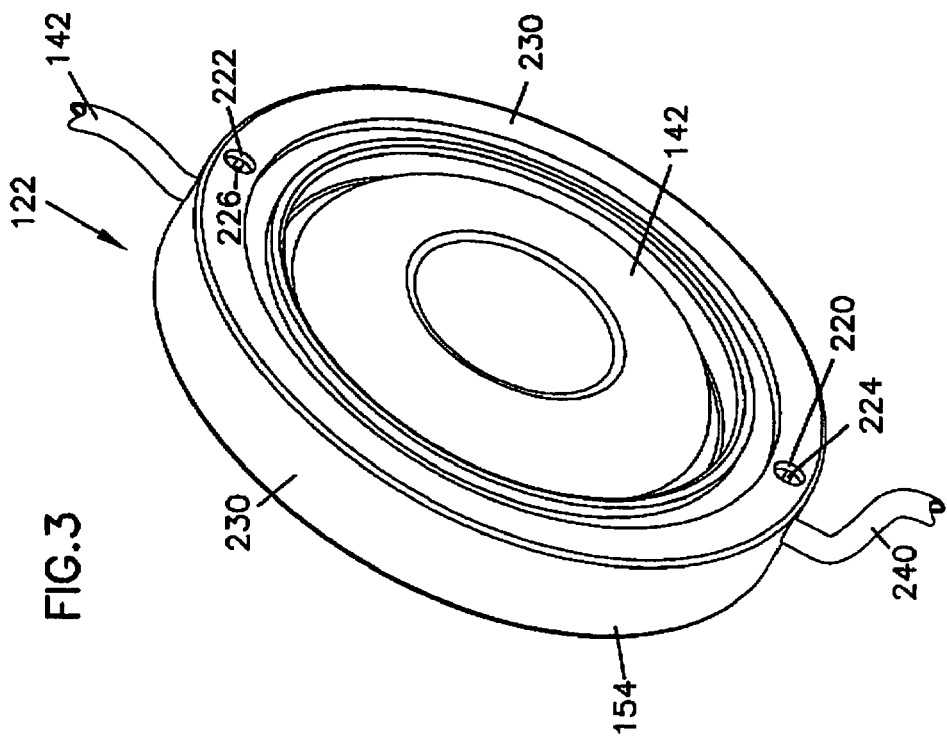
FIG. 3 is a rear perspective view of the diaphragm assembly shown in FIG. 1.
Figure 2:
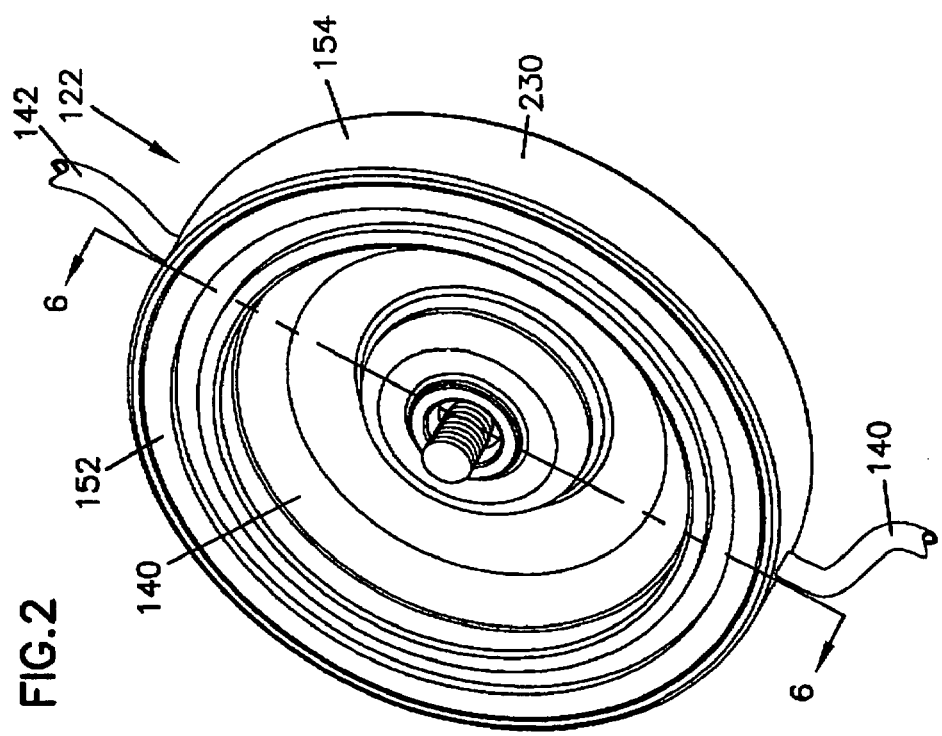
FIG. 2 is a front perspective view of the diaphragm assembly shown in FIG. 1.
Figure 4:
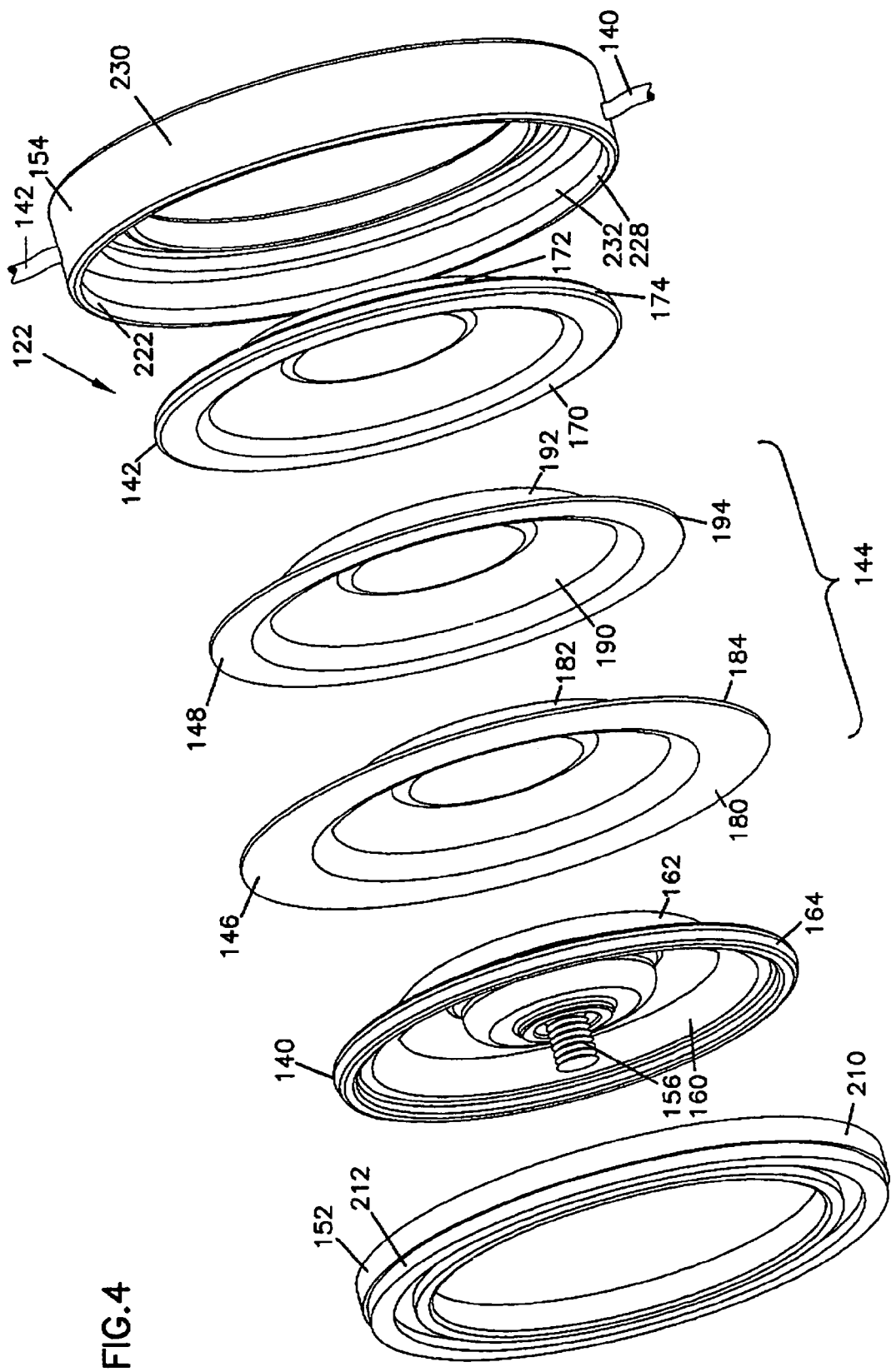
FIG. 4 is an exploded front perspective view of the diaphragm assembly shown in FIG. 1.
Figure 5:
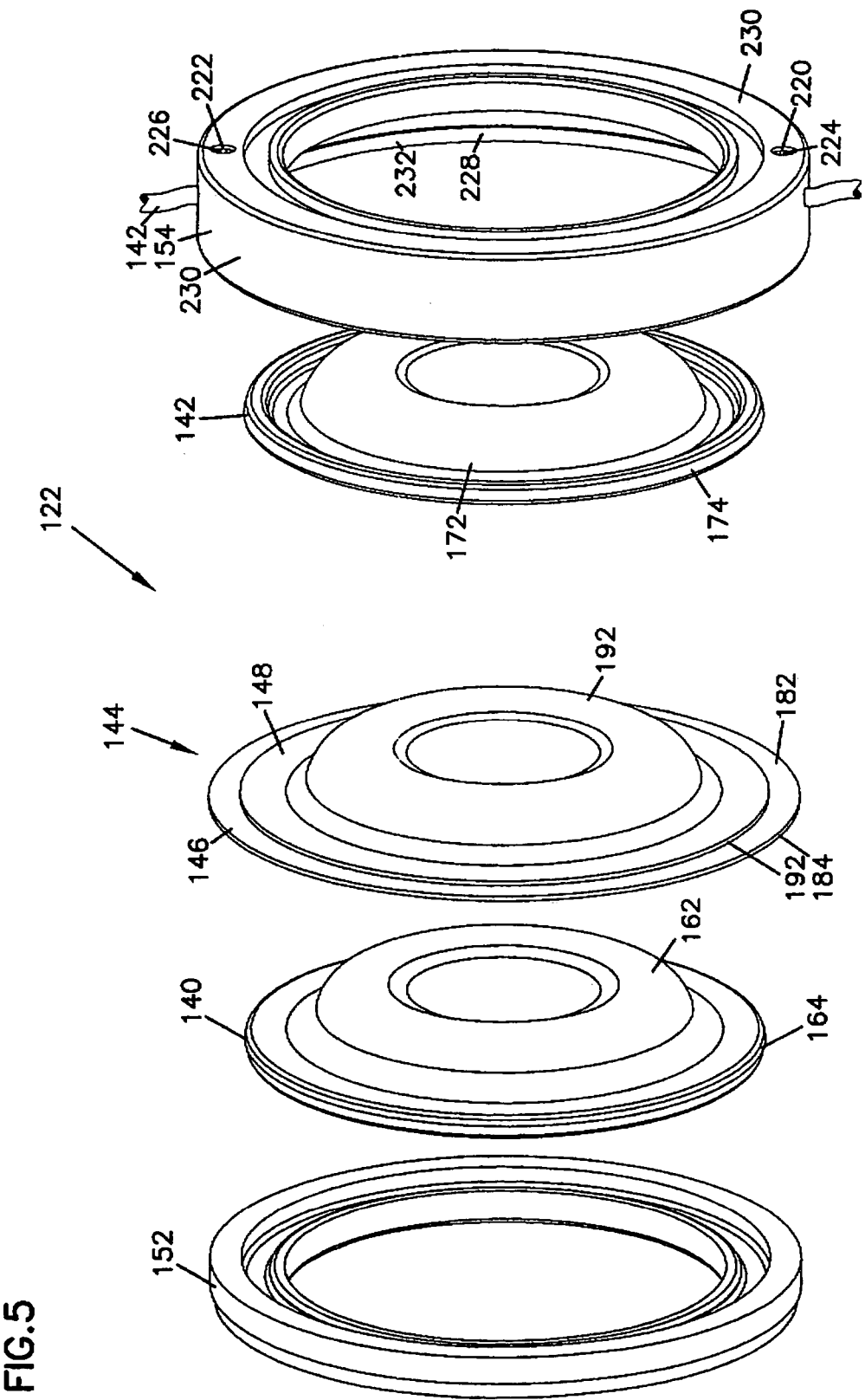
FIG. 5 is a an exploded rear perspective view of the diaphragm assembly of FIG. 1.
Figure 6:
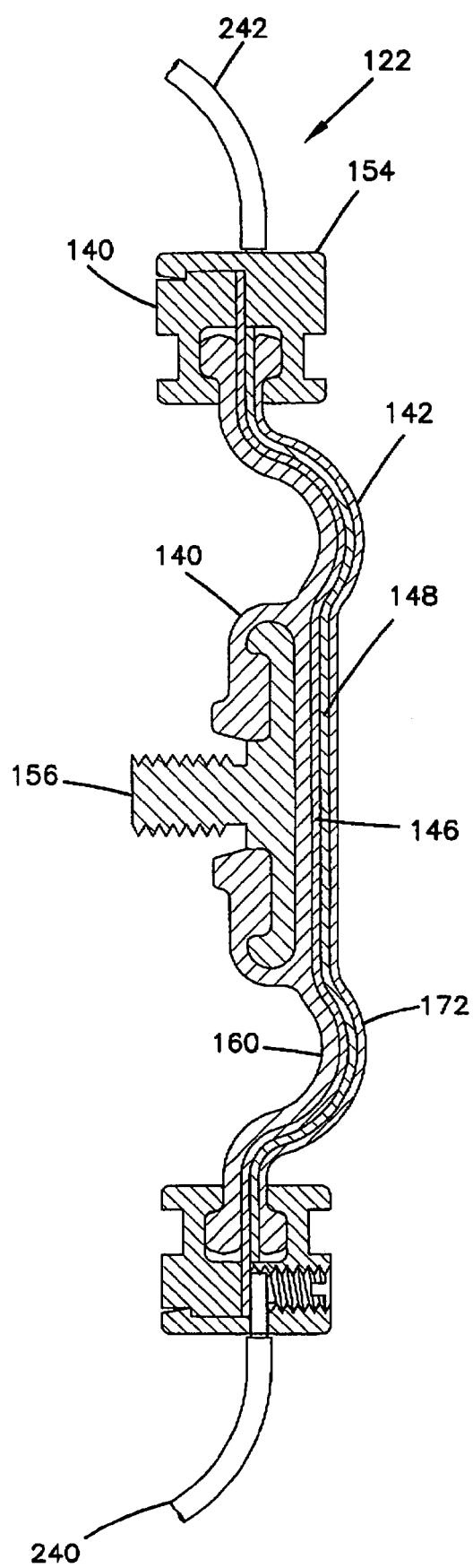
FIG. 6 cross-sectional view of the diaphragm assembly shown in Figure 2 taken along cross-sectional indicators 6-6.

An example of diaphragm pump 120 utilizing a diaphragm 122 according to principles of the invention is shown in FIG. 1. Pump 120 includes a first chamber 124 exposed to the process fluid being pumped, and a second chamber 126 that retains hydraulic fluid. The diaphragm 122 is positioned between the first and second chambers 124, 126 and is sealably secured within the pump to provide a sealed interface between the hydraulic fluid and the process fluid. Outside of the diaphragm 122, pump 120 includes features and functionality that corresponds with known diaphragm pumps as described in the Background section above.

Diaphragm 122 includes first layer 140, second layer 142, and a middle or third layer 144, as shown in FIGS. 1-7. A conductive trace 150 is formed on a primary surface of third layer 144 (see the example conductive trace pattern shown formed on third layer 144 in FIG. 8). The layers 140, 142, 144 may be retained together with first and second rim members 152, 154 that, when secured together, create a packaged assembly that is relatively easy to handle for transportation and installation purposes. The use of a rim to retain the diaphragm layers is particularly useful when the diaphragm layers are not bonded together such that they are independently movable relative to each other when the diaphragm is in use.

First layer 140 includes first and second sides 160, 162, and an outer circumference surface 164. First layer 140 is sized to engage an inner surface of first ring 152 and to form a seal there between. Since ring 152 is open at its center, the first side 162 of first layer 140 is exposed at the center of ring 152. A valve connector 156 is insert molded within layer 140 and configured to be coupled to a valve stem 158 of the drive piston assembly 157 on the hydraulic drive side of the pump (see FIG. 1).

Second layer 142 includes first and second sides 170, 172 and an outer circumference surface 174. Second layer 142 is sized to seat within second ring 154 and to form a seal there between (see FIG. 6). Because second ring 154 is also open at its center, second surface 172 is exposed at the center of ring 154.

Figure 7:
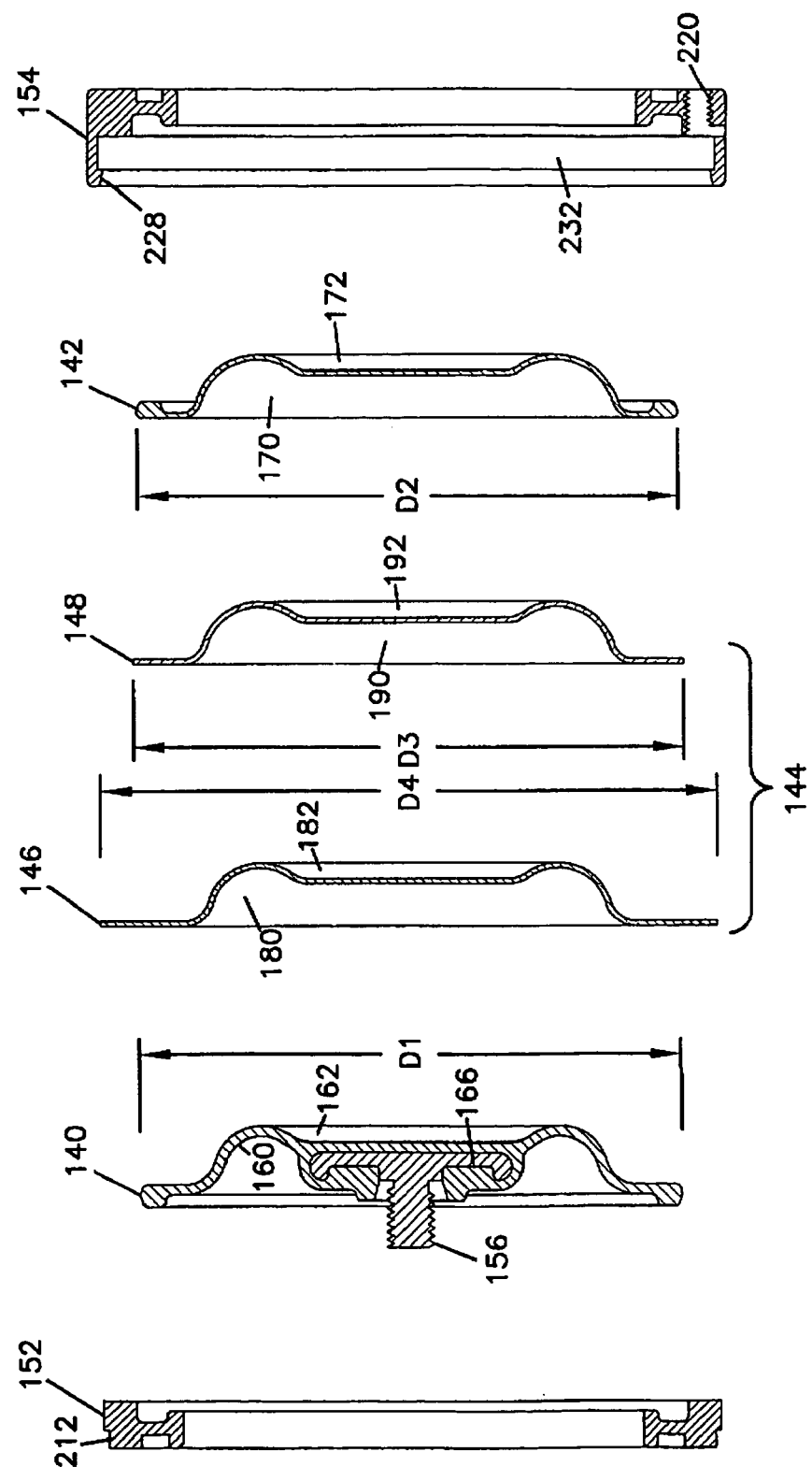
FIG. 7 is an exploded view of the cross-sectional view shown in FIG. 6.

The first portion 146 of third layer 144 includes first and second side surfaces 180, 182 and an outer circumference surface 184. The second portion 148 of third layer 144 includes first and second side surfaces 190, 192 and an outer circumference surface 194. As shown in FIG. 7, first portion 146 has a larger diameter (D4) than the diameters D1, D2, D3 of respective layers 140, 142 and second portion 148. The larger diameter D4 provides exposure of a portion of first portion 146 beyond the outermost circumference surfaces of the first and second layers 140, 142 and second portion 148 of diaphragm 122a. A portion of conductive trace 150 may then be formed on second side 182 such that a portion of trace 150 is also exposed when the diaphragm layers are assembled together. This exposed portion of conductive trace 150 makes it possible to easily connect electric leads 240, 242 at first and second ends 202, 204 of the conductive trace pattern 200 (see FIGS. 6 and 8) without interfering with the other diaphragm layers.

Second rim portion 154 may include first and second connector openings 220, 222 and first and second connecting members 224, 226 at an outer face 230 for retaining the first and second leads 240, 242 in electrical contact with first and second ends 202, 204 of the conductive trace 150. Although first and second connecting members 224, 226 are shown as threaded fasteners in this embodiment, other types of fasteners or securing/retaining methods may be used to maintain electrical contact between the first and second leads 240, 242 and the conductive trace 150 in other embodiments.

First rim member 152 includes an outer circumference surface 210 and a recessed portion 212 formed therein that is sized to engage a retaining clip 228 at an inner surface 232 of the second rim member 154. Engagement of recessed portion 212 with retaining clip 228 forms a snap fit connection between the first and second rim members 152, 154 in order to retain the first, second and third layers 140, 142, 144 together. In other embodiments, the first, second and third layers 140, 142, 144 may be retained together with other means outside of the rim members shown such as, for example, rivets, fasteners, clamps, adhesives that are applied near an outer edge of the layers. In yet further embodiments, the layers 140, 142, 144 may be laminated, molded, adhered, heat welded, sonic welded or otherwise secured together across the primary surfaces of the layers so as to form a unitary diaphragm member without a separate ring or other retaining structure. However, as discussed above, the layers 140, 142, 144 are preferably independently movable relative to each other except at an outer edge where ring members 152, 154 secure the layers together.

The phrase "independently movable relative to each other" as used herein defines the relative movement of the layers to each other as the layers are deformed during use. When the layers are bonded together across their entire primary surfaces, large shear forces are generated, particularly if the layers are made from different materials that have different physical properties that allow them to stretch or deform at different rates relative to each other. As will be discussed further below, some of the layers of the diaphragm 122 may have a different modulus of elasticity than other layers, which may create further shear forces. Furthermore, if the layers were secured together across their primary surfaces, a failure condition, such as a crack, in one layer would easily propagate through to one or more of the other layers.

An advantage of having the layers 140, 142, 144 independently movable relative to each other is that in most instances only one layer will fail at a time, thereby providing sufficient notice for the pump to be shut off before all of the layers fail. To further enhance the independent movement of the layers 140, 142, 144, diaphragm 122 may include a lubricant layer in between the layers, which also reduces friction induced wear between the layers. Silicone grease is one example lubricant that may be useful for this purpose, although any non-conductive lubricant that is compatible with the elastomers being used in the diaphragm may be used. The use of lubricants for reducing wear and friction between two members is well known in many applications, but is not known for use between elastomeric layers of a pump diaphragm.

Figure 8:
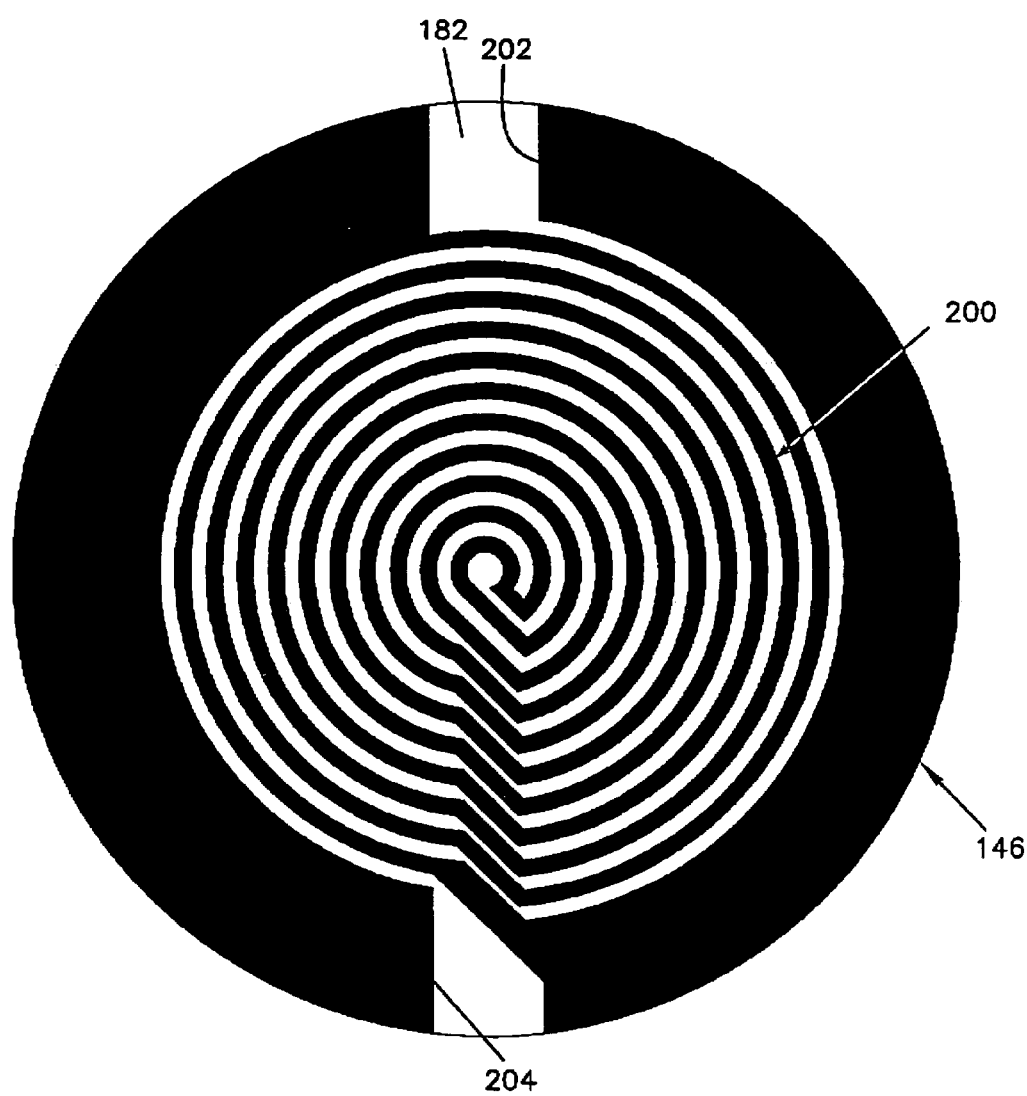
FIG. 8 is a rear plan view of one of the diaphragm layers shown in FIG. 4 having an example conductive trace pattern formed thereon according to principles of the present invention.
Figure 9:
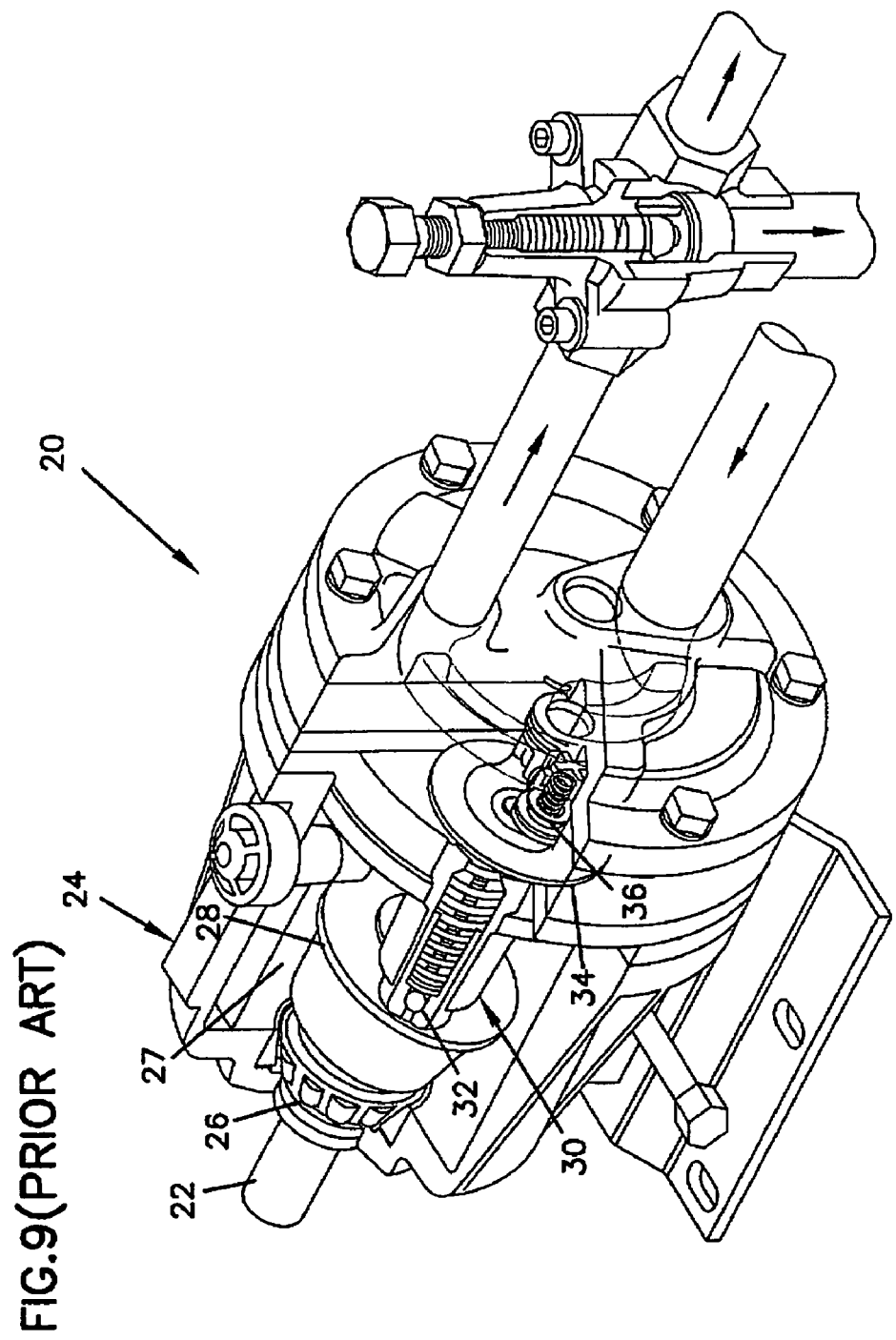
FIG. 9 is a perspective view of a conventional diaphragm pump.
Figure 10:
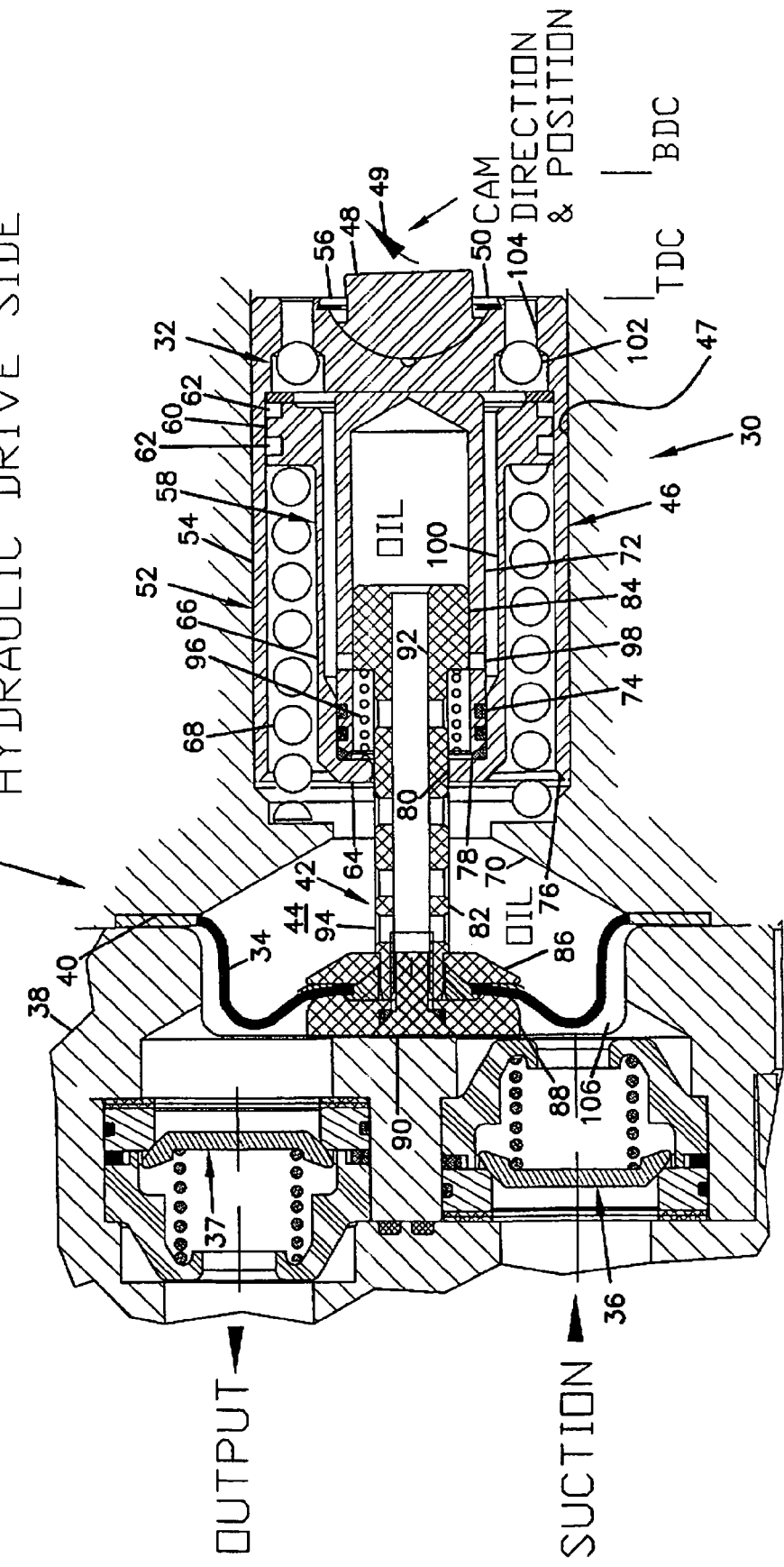
FIG. 10 is a partial cross-sectional view of the conventional diaphragm pump shown in FIG. 9.
Figure 11A:
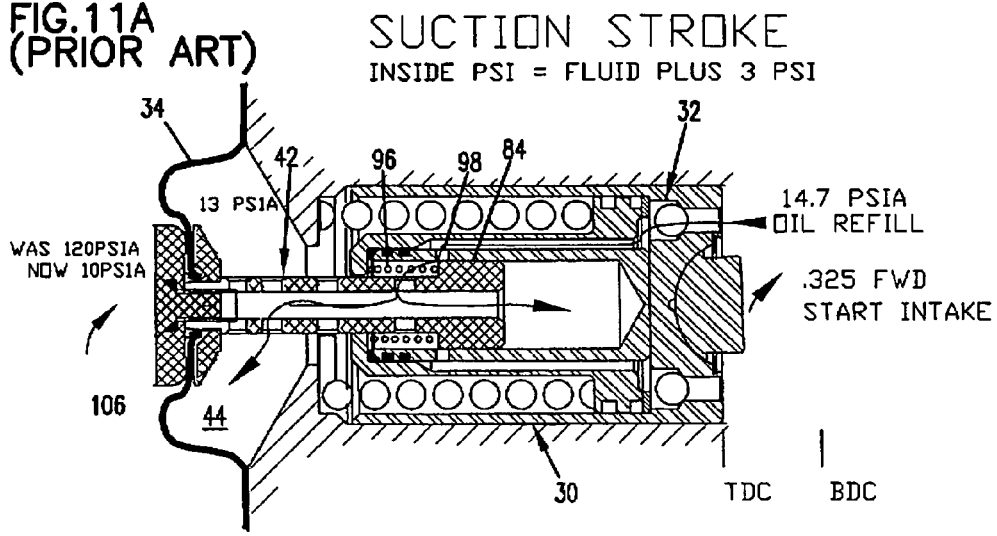
FIGS. 11(a)-(f) illustrate operation of the conventional pump under normal, standard operating conditions using a conventional bias spring.
Figure 11B:
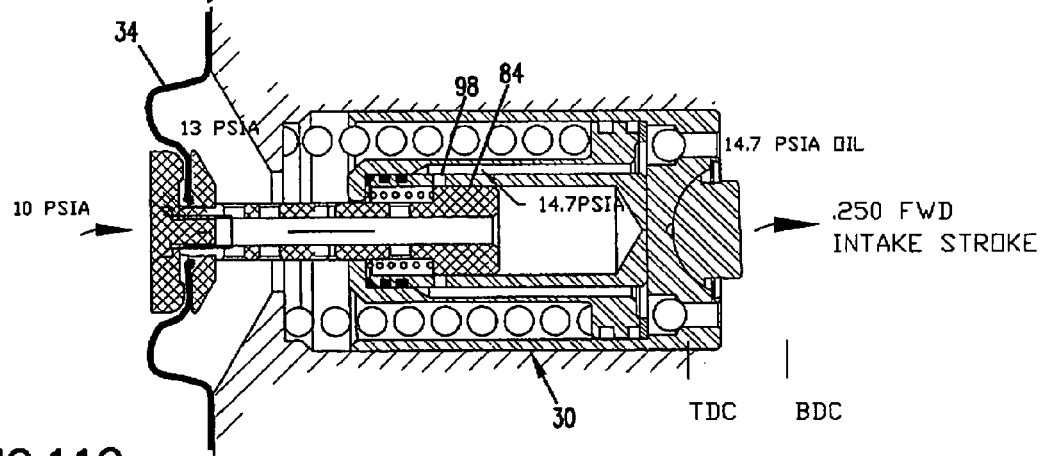
Figure 11C:
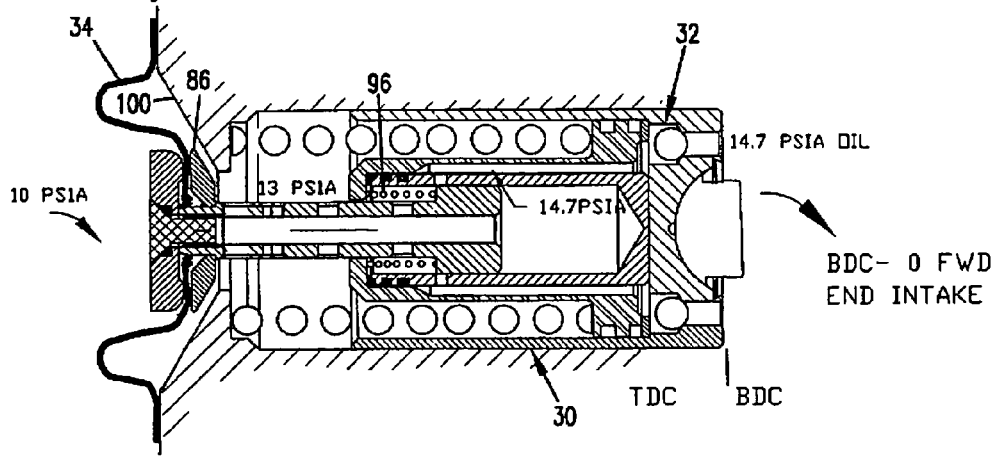
Figure 11D:
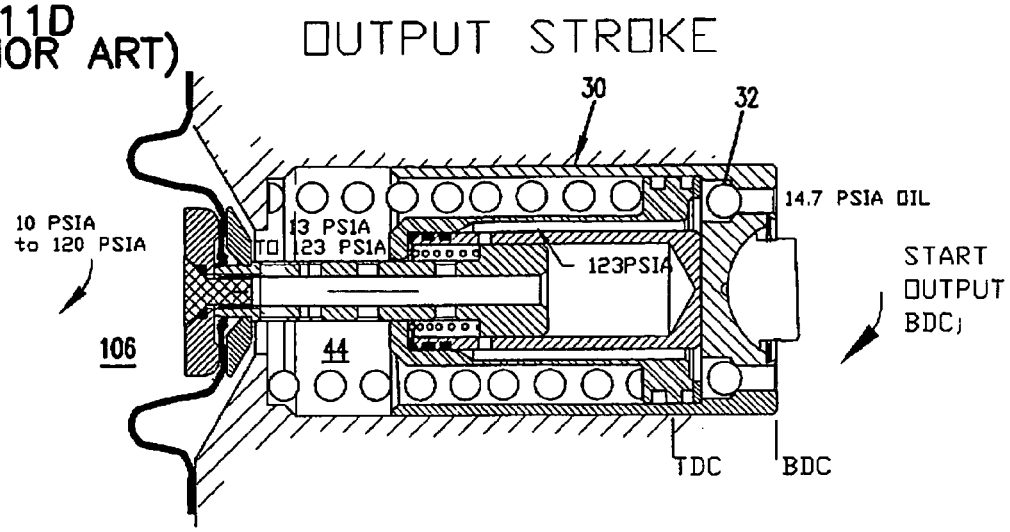
Figure 11E:
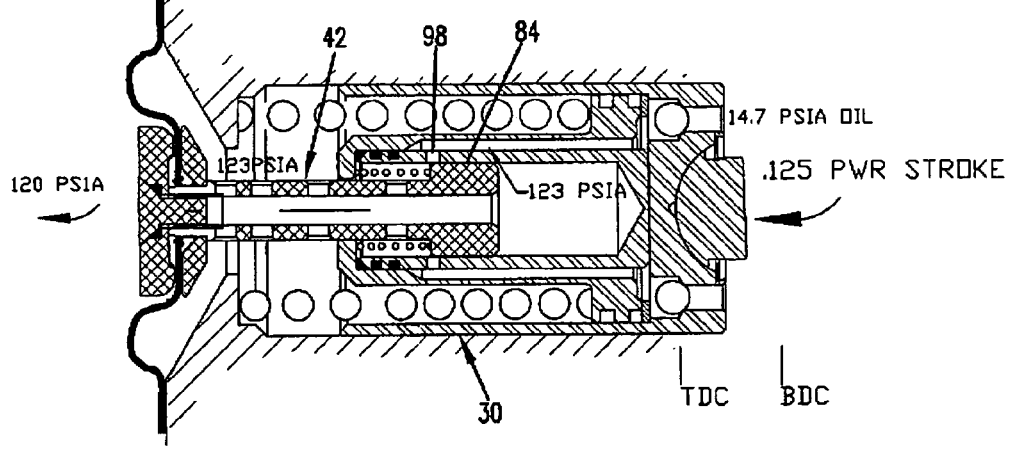
Figure 11F:
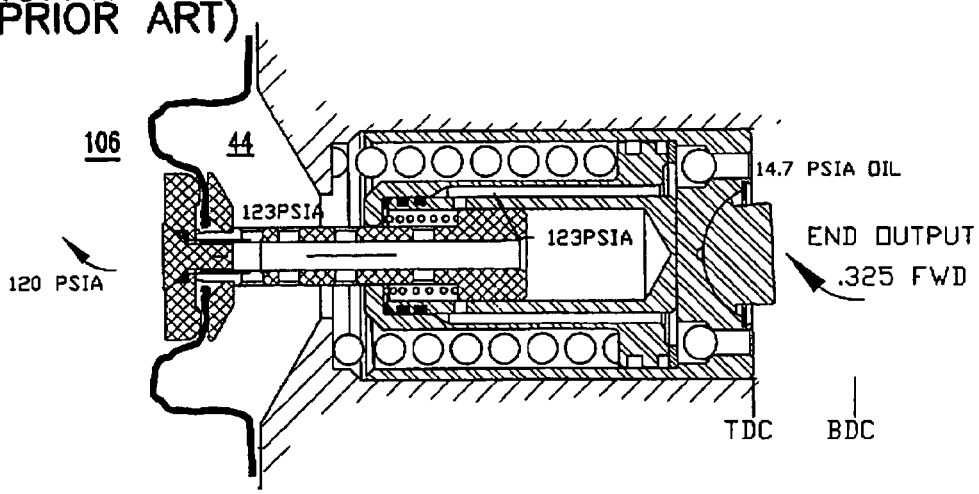

The conductive trace 150 shown in FIG. 8 is a continuous spiral with first and second ends 202, 204 exposed on second surface 182 near the outer circumference surface 184 of first portion 146 of third layer 144. This example pattern is only one of a variety of different patterns that may be used to provide the necessary sensitivity to changes in resistance of the pattern as the diaphragm 122 is deformed during use. The conductive trace 150 may be formed of a variety of different materials or combination of material so long as trace 150 has electrical conductive properties and is resistant to high strain conditions, for example, strain greater than 20%. These levels of strain typically exclude the possibility of using metallic substances such as copper and metal alloys as trace materials. An example binder material for conductive trace 150 is an elastomeric substance such as silicone latex, or urethane that binds a conductive material such as carbon power to first portion 146. The conductive material provides the required electrical conductive properties and has little effect on the elastomeric properties of the binder such that the conductive trace 150 is resistant to strain greater than 20%.

The conductive material of conductive trace 150 may be supplied in the form of conductive inks and other substances that will bond well to elastomeric materials with a binder so long as the conductive material maintains electrical conductivity under high strain conditions. Silver, gold and other conductive metals maybe used in a powder form that is effectly secured to first portion 146 with the binders discussed above. The conductive trace is preferably a continuous member with two free ends so that a power source can pass current through the conductive trace and monitor the resistance of the conductive trace during use of diaphragm 122.

Conductive trace 150 may be formed using any application process that is capable of providing a very thin layer of material, such as, for example, silk screening, pad printing and spraying.

The first and second portions 146, 148 of third layer 144 are shown as separate layers in the figures, but are ultimately bonded together in such a way as to form a single layer in the final product with the conductive trace 150 embedded therein. First and second portions 146, 148 are made of an elastomeric material such as silicone, buna, neoprene, TPR, or urethane that is resistant to high levels of strain greater than 20%. Preferably, the first and second portions 146, 148 are made of the same material to improve the bond formed between the layers. In one method of bonding, the first layer 146 is formed using any available process. Next, the conductive trace 150 is formed on first layer 146 using for example, one of the methods disclosed above. Next, the second portion 148 is bonded to the first portion 144 using a forming process such as molding, applying a liquid layer (e.g., spraying), or laminating the two layers with an adhesive so as to form the combined third layer 144 shown in FIG. 5. In this bonded state, the conductive trace 150 is preferably completely covered except at an outer edge of the first portion 146 (which exposed portion is covered by rim members 152, 154 when the diaphragm is assembled) so as to be protected from exposure to the hydraulic and process fluids of pump 120. The exposed portion of trace 150 near the outer circumference surface 184 of first portion 146 is positioned within first and second rim members 152, 154 so that electrical contact is limited to contact with first and second leads 240, 244 and second rim member 154.

In order to reduce the possibility of shorting or otherwise interfering with the electrical signal in conductive trace 150, rim members 152, 154 may be made of a non-conductive material such as fiberglass or a polymer material, or may include a layer of such non-conductive material at the points in which contact with conductive trace 150 are made when diaphragm 122 is assembled. Protection of the conductive trace 150 from exposure to the liquids of pump 120 significantly reduces the possibility of failure being masked by the liquid conductivity. Furthermore, since the conductive trace is made from a very thin layer embedded within layer 144, only a very small cross section of conductive material is exposed when layer 144 is cut or broken. The conductivity of this small area contacting a conductive fluid is small compared to the trace when it is intact, and therefore effectively eliminates the need for ground fault detection for diaphragm 122.

Certain advantages of the present invention can be described using a discussion of the various modes of diaphragm failure. The most common failure mode occurs when a failure in the hydraulic oil volume control allows too much oil behind the diaphragm (at the first side 160 of first layer 140). In this situation, the diaphragm balloons forward until it contacts openings in the first chamber 124 that cut the diaphragm. In the case where the layers of the diaphragm are independently movable from each other, no oil can leak through the diaphragm when only the outer (second layer 142) layer is cut because the first and second layers 140 and 144 remain intact and the failure in the second layer does not propagate to the first and third layers. Because the conductive trace 150 is able to monitor mere changes in resistance that indicate both actual failure and possibly initiation of a failure condition as opposed to rather than require a break in the conductive trace or exposure of the conductive trace to a conductive fluid determine failure of one of the diaphragm layers as known in the art, there may be a better chance that the pump can be turned off before all of the layers fail.

Another type of diaphragm failure is fatigue. Fatigue can occur over time as the diaphragm layer materials deteriorate and cracks begin to form. If this type of failure occurs in either the first or second layer 140, 142, a change in resistance will occur either because more stress is added to the conductive trace. In the event that both of the first and second layers 140, 142 fail at the same time, the third layer will still provide fluid separation until failure of that layer occurs. When the third layer 144 is the last layer to fail, the spike in resistance levels due to failure of the first and second layers may be used to initiate shut down of the pump preferably before the third layer fails so as to eliminate or at least significantly reduce the mixing of the process and hydraulic fluids in the pump.

A method of forming or manufacturing a pump diaphragm according to principles of the invention may include forming a first portion of an elastomeric layer, forming a conductive trace on the first portion of the elastomeric layer, and forming a second portion of the elastomeric layer on the first portion of elastomeric layer over a section of the conductive trace such that the first and second portions are integral with each other and an outer periphery of the conductive trace is exposed. Further steps in such a method may include positioning the elastomeric layer between first and second layers to form a multi-layer diaphragm. A still further step in this method may include applying lubricant between the various layers of the diaphragm.

A method of detecting rupture of a diaphragm in a hydraulic pump according to the principles of the invention may include positioning a first elastomeric layer in contact with a process fluid to be pumped, positioning a second elastomeric layer in contact with a hydraulic oil of the pump, positioning a second elastomeric layer in contact with the hydraulic oil of the pump, positioning a third elastomeric layer between the first and second layers, and applying and embedding a conductive trace in the third layer. The method may also include applying an electric current to the conductive trace and detecting variations in electrical resistance in the conductive trace and generating a detection signal representative of changes in the electrical resistance. The detection signal may be used to provide a warning that there is a change in condition of the diaphragm, or may be used to automatically shut off the hydraulic pump. Such a method may also include securing the layers together in such a way that the layers are independently movable relative to each other when the diaphragm is deformed during use.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A multi-layer diaphragm for use in a hydraulically driven pump, the diaphragm comprising:
    a first layer in contact with a pumped fluid;
    a second layer in contact with a hydraulic oil of the pump; and
    a third layer including a conductive trace, the third layer being positioned between the first and second layers, the third layer being independently movable relative to the first and second layers.

2. The diaphragm of claim 1, wherein the third layer includes an elastomeric material.

3. The diaphragm of claim 1, wherein the conductive trace is embedded in the third layer.

4. The diaphragm of claim 1, wherein the first layer and second layer include buna rubber.

5. The diaphragm of claim 1, wherein the third layer includes silicone.

6. The diaphragm of claim 1, wherein the conductive trace layer includes carbon and silicone and is capable of withstanding strain greater than 20%.

7. The diaphragm of claim 1, wherein the conductive trace is formed as a continuous spiral with opposing ends of the conductive trace being coupled to separate electrical leads.

8. The diaphragm of claim 1, further comprising first and second rings configured to retain the first, second and third layers together.

9. The diaphragm of claim 1, further comprising a lubrication layer positioned between the third layer and at least one of the first layer and the second layer.

10. The diaphragm of claim 1, wherein the molded third layer includes first and second portions bonded together with the conductive trace positioned between first and second portions.

11. The diaphragm of claim 10, wherein the first portion, the second portion and the conductive trace each have an outer diameter, the outer diameter of the first portion being greater than the outer diameter of the trace, and the outer diameter of the conductive trace being greater than the diameter of the second portion.

12. The diaphragm of claim 1, wherein the first, second and third layers comprise elastomeric materials and are configured to resist rupture under high strain conditions.

13. A method of manufacturing a pump diaphragm, the diaphragm including an elastomeric layer and a conductive trace, the method comprising the steps of:
forming a first portion of the elastomeric layer, the first portion having a primary surface;
forming the conductive trace on the primary surface of the first portion of the elastomeric layer; and
forming a second portion of the elastomeric layer on the primary surface of the first portion over a portion of the conductive trace;
wherein the diaphragm further includes first and second layers, and the method further comprises positioning the elastomeric layer between the first and second layers.

14. The method of claim 13, wherein the first and second portions are integral with each other.

15. The method of claim 13, wherein an outer periphery of the conductive trace is exposed for electrical connection.

16. The method of claim 13, further comprising applying lubricant between the first and second layers and the elastomeric layer.

17. The method of claim 13, wherein the conductive trace is configured as a continuous member having first and second ends.

18. The method of claim 13, further comprising forming the conductive trace using silk screening.

19. The method of claim 13, further comprising forming the elastomeric layer from a material comprising silicone.

20. The method of claim 13, further comprising forming the conductive trace from a material comprising silicone and carbon.

21. The method of claim 13, wherein the step of forming the second portion including a molding, heat bonding, or laminating process.

22. A method of detecting rupture of a diaphragm in a hydraulic pump that includes a first layer, a second layer, and a third layer, the third layer including a conductive trace, the method comprising the steps of:
positioning the first layer in contact with a fluid being pumped by the hydraulic pump;
positioning the second layer in contact with a hydraulic oil of the hydraulic pump;
positioning the third layer between the first and second layers;
applying an electric current to the conductive trace;
detecting variations in an electrical property in the conductive trace resulting from use of the diaphragm in the hydraulic pump;
shutting off the hydraulic pump when the variations are within a predetermined range; and
coupling the first, second and third layer together at a periphery of the layers with center portions of the layers being free to move relative to each other.

23. The method of claim 22, further comprising generating a detection signal, wherein the detection signal indicates existence of a failure condition in at least one of the first, second and third layers.

24. The method of claim 22, further comprising exposing the conductive trace only at an outer periphery of the third layer and electrically connecting the exposed portion of the conductive trace to the electric current.

25. The method of claim 22, wherein the hydraulic pump further includes a lubrication layer, and the method further comprises positioning the lubrication layer between the third layer and at least one of the first layer and the second layer.

26. The method of claim 22, further comprising embedding the conductive trace in the third layer.

27. A multi-layer diaphragm for use in a hydraulically driven pump, the diaphragm comprising:
a first layer having a first modulus of elasticity;
a second layer having a second modulus of elasticity;
a third layer positioned between the first and second layers and having a third modulus of elasticity lower than the first and second modulus of elasticity, the third layer including a conductive trace that is removed from contact with fluids in the pump;
wherein the conductive trace comprises an elastomeric material and is integral with the third layer.

28. The diaphragm of claim 27, wherein the conductive trace is exposed at an outer periphery of the third layer at a location.

29. The diaphragm of claim 27, wherein the third layer includes silicone and the conductive trace includes silicone and carbon.

30. A hydraulically driven pump, comprising:
a first chamber exposed to a pumped fluid;
a second chamber configured to retain a hydraulic fluid; and
a multi-layer diaphragm positioned between the first and second chambers and including:
a first layer in contact with the pumped fluid;
a second layer in contact with the hydraulic fluid; and
a third layer including a conductive trace, the third layer being positioned between the first and second layers and being movable relative to at least one of the first layer and the second layer.

31. The pump of claim 30, wherein the third layer includes an elastomeric base material.

32. The pump of claim 30, wherein the conductive trace comprises an elastomeric material and is embedded in a base material of the third layer.

33. The pump of claim 30, wherein the elastomeric base material includes silicone and the conductive trace includes carbon.

34. The pump of claim 30, wherein changes in an electrical resistance of the conductive trace indicate a failure condition in one of the first, second and third layers.

35. A method of manufacturing a pump diaphragm, the diaphragm including an elastomeric layer and a conductive trace, the method comprising the steps of:
- forming a first portion of the elastomeric layer, the first portion having a primary surface;
- forming the conductive trace on the primary surface of the first portion of the elastomeric layer; and
- forming a second portion of the elastomeric layer on the primary surface of the first portion over a portion of the conductive trace;
- wherein an outer periphery of the conductive trace is exposed for electrical connection.

36. A method of manufacturing a pump diaphragm, the diaphragm including an elastomeric layer and a conductive trace, the method comprising the steps of:
- forming a first portion of the elastomeric layer, the first portion having a primary surface;
- forming the conductive trace on the primary surface of the first portion of the elastomeric layer;
- forming a second portion of the elastomeric layer on the primary surface of the first portion over a portion of the conductive trace; and
- forming the elastomeric layer from a material comprising silicone.

37. A method of detecting rupture of a diaphragm in a hydraulic pump that includes a first layer, a second layer, and a third layer, the third layer including a conductive trace, the method comprising the steps of:
- positioning the first layer in contact with a fluid being pumped by the hydraulic pump;
- positioning the second layer in contact with a hydraulic oil of the hydraulic pump;
- positioning the third layer between the first and second layers;
- applying an electric current to the conductive trace;
- detecting variations in an electrical property in the conductive trace resulting from use of the diaphragm in the hydraulic pump;
- shutting off the hydraulic pump when the variations are within a predetermined range; and
- embedding the conductive trace in the third material.

38. A multi-layer diaphragm for use in a hydraulically driven pump, the diaphragm comprising:
- a first layer having a first modulus of elasticity;
- a second layer having a second modulus of elasticity; and
- a third layer positioned between the first and second layers and having a third modulus of elasticity lower than the first and second modulus of elasticity, the third layer including a conductive trace that is removed from contact with fluids in the pump;
- wherein the third layer includes silicone and the conductive trace includes silicone and carbon.

* * * * *